United States Patent
Thompson

[11] 3,762,666
[45] Oct. 2, 1973

[54] HYPERVELOCITY MISSILE DESIGN TO ACCOMODATE SEEKERS

[75] Inventor: Guy P. Thompson, Huntsville, Ala.

[73] Assignee: The United States of America as represented by the Secretary of the Army.

[22] Filed: June 8, 1971

[21] Appl. No.: 151,083

[52] U.S. Cl.............................. 244/3.19, 102/105
[51] Int. Cl................................................ F42b 15/02
[58] Field of Search.......................... 244/3.16, 3.19; 102/70.2 P, 105

[56] References Cited
UNITED STATES PATENTS

| | | | |
|---|---|---|---|
| 3,524,608 | 8/1970 | Nicholson et al. | 244/3.16 |
| 3,165,749 | 1/1965 | Cushner | 244/3.19 X |
| 3,292,544 | 12/1966 | Caldwell et al. | 102/105 |
| 3,243,313 | 3/1966 | Aves, Jr. | 102/105 X |
| 3,616,140 | 10/1971 | Copeland | 102/105 X |
| 3,336,873 | 8/1967 | Wilford | 102/105 |
| 3,270,503 | 9/1966 | Meyer, Jr. | 102/105 X |
| 3,040,661 | 6/1962 | Ross | 102/70.2 P |
| 3,555,550 | 2/1959 | Walters | 102/105 |
| 3,410,502 | 11/1968 | Leadon et al. | 102/105 X |

FOREIGN PATENTS OR APPLICATIONS

| | | |
|---|---|---|
| 884,128 | 12/1961 | England |

*Primary Examiner*—Benjamin A. Borchelt
*Assistant Examiner*—H. J. Tudor
*Attorney*—Harry M. Saragovitz, Edward J. Kelly, Herbert Berl and Herbert H. Murray

[57] ABSTRACT

A missile having a seeker portion in its head end. The front end of said seeker portion being in the form of a protective cone spaced from the main body of the missile. Said cone being coated with either ceramic or ablative material whereby air and foreign particles therein will be diverted outwardly away from the missile to prevent excessive heating of the seeker dome or erosion thereof.

1 Claim, 1 Drawing Figure

PATENTED OCT 2 1973　　3,762,666
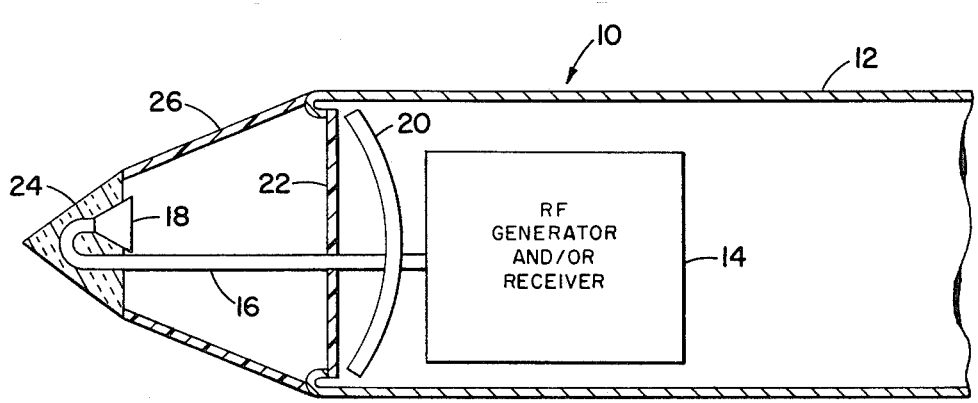
Guy P. Thompson,
INVENTOR

HYPERVELOCITY MISSILE DESIGN TO ACCOMODATE SEEKERS

BACKGROUND OF THE INVENTION

Present missile designs using seekers are limited in the velocity at which they can be operated because of the material problem associated with the radome. The radome cannot withstand the temperature generated as a result of air friction at hypervelocities. Also during missile flight through rain, present radomes erode thus causing a degradation of seeker antenna beam pattern. The electrical properties required of the radome limit the materials which may be used for such application. Thus, it appears that missiles which use radomes will be limited in their velocities because of the two problems mentioned above.

A missile design which would permit missile velocities higher than those capable of use with the use of radomes would be very desirable in air defense applications as well as ballistic missile defense and other applications i.e. surface to surface. A particular advantage of a hypervelocity missile would be realized against high performance aircraft during the terminal portion of the missile flight. This advantage would be realized through a reduced possibility of the aircraft out maneuvering the missile during the terminal phase of the missile flight. An advantage against low flying aircraft may also be realized since the flight time of the missile to intercept would be reduced. The possibility of the aircraft flying out of line of sight of the illuminating device would be reduced accordingly. It is therefore an object of this invention to provide a missile of the seeker type which is capable of higher velocities than those previously obtained by seeker type missiles using radomes.

SUMMARY OF THE INVENTION

In accordance with this invention a seeker type missile is provided which instead of the conventional radome is provided with a cone shaped member spaced axially from the front end of the missile to direct the air particles or rain drops outwardly away from the conical shaped RF permeable membrane which connects said cone shaped member to the forward end of the missile. By means of this cone shaped member spaced axially from the front end of the missile the particles of air or rain drops do not touch the conical shaped membrane therefore there is no heating effect on this membrane to distort the RF energy passing therethrough and there is no erosion of said membrane to make the material opaque to the RF energy.

BRIEF DESCRIPTION OF THE DRAWING

The single FIGURE of the drawing is a half section partially schematic of a missile designed in accordance with the present invention.

DETAIL DESCRIPTION OF THE INVENTION

Referring now to the drawing, a missile generally indicated 10 comprises a casing 12 having mounted therein an RF device 14 which may be a generator and/or receiver. The antenna 16 of the RF device which projects forwardly from the casing 12 is U-shaped so that its open or radiating end 18 faces rearwardly. The radiation projects into a parabolic reflector 20 mounted within the forward end of the casing 12. The antenna may be of the simple horn feed or of the shielded end-fire type. The reflector 20 is suitably mounted for nutation or movement necessary for scanning or to provide the necessary angle between the missile flight path and the seeker line of sight in a manner well known in the art of seeker type missiles.

A membrane 22 of fiberglass or other suitable plastic is mounted across the forward end of the missile casing 12 to seal the forward end of the casing. The membrane 22 must be transparent to the RF energy passing therethrough.

A cone 24 is mounted on the antenna horn 16 adjacent the forward most portion thereof. The axes of the cone 24 and the missile are coincident. The surface of the cone 24 may be coated with ceramic or ablation type material to withstand the high temperatures generated by passage of the missile through the atmosphere. A truncated conical membrane 26 connects the base of the cone 24 with the forward end of the casing 12. The angle between the outer surface of cone 24 and the longitudinal axis of the missile is greater than the angle between the outer surface of the truncated conical membrane 26 and the longitudinal axis of the missile. Membrane 26 would be constructed of the same type of material as membrane 22.

OPERATION OF THE INVENTION

During hypervelocity flight of the missile air particles and rain drops would be directed outwardly by the protective cone 24 away from the conical membrane 26 thus preventing generation of high temperature within the membrane 26 and also preventing erosion thereof by impingement with the rain particles. Thus the conical membrane 26 is protected and will not cause distortion or degeneration of the RF energy passing therethrough by means of excessive temperatures or erosion of the material of the membrane.

It is recognized that a plasma would be generated about the body of such a hypervelocity missile. The plasma thus generated would hinder transmission of certain frequencies of the electromagnetic spectrum, however, by choosing a window in the plasma or a frequency above the critical frequency of the plasma entirely satisfactory operation of the seeker would be ensured. A window is defined as a frequency at which a particular frequency of RF energy will be transmitted through the plasma at low attenuation. Critical frequency is the highest frequency at which the plasma will reflect incident electromagnetic energy. Frequencies higher than the critical frequency will pass through the plasma.

I claim:

1. In a hypervelocity missile having a cylindrical casing, an RF device mounted within the forward end of said casing, an antenna horn projecting forwardly from the RF device with the open end of the horn projecting rearwardly toward said casing, and a reflecting device mounted within the forward end said casing the improvement which comprises:

a cone mounted on the forward most portion of said antenna horn, the axis of said cone being coincident with the missile axis, a protective coating of heat resistive material on the outer surface of said cone, a truncated conical membrane of RF transparent material connecting the base of said cone with the forward end of said missile casing, the angle between the outer surface of said truncated conical membrane and the longitudinal axis of said missile being considerably smaller than the angle between the outer surface of said cone and the longitudinal axis of said missile.

* * * * *